(12) United States Patent
Momose et al.

(10) Patent No.: US 8,711,587 B2
(45) Date of Patent: Apr. 29, 2014

(54) POWER CONVERTER WITH A VARIABLE REFERENCE VOLTAGE AND INRUSH CURRENT LIMITING

(75) Inventors: Ryuji Momose, Tokyo (JP); Katsuyuki Amano, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 301 days.

(21) Appl. No.: 13/246,926

(22) Filed: Sep. 28, 2011

(65) Prior Publication Data

US 2012/0106212 A1    May 3, 2012

(30) Foreign Application Priority Data

Oct. 29, 2010    (JP) .................................. 2010-243084

(51) Int. Cl.
*H02M 1/32*    (2007.01)
(52) U.S. Cl.
USPC ................................. 363/53; 361/58; 323/908
(58) Field of Classification Search
USPC .................... 323/908; 361/58, 92; 363/52–54
See application file for complete search history.

(56) References Cited

U.S. PATENT DOCUMENTS

| | | | |
|---|---|---|---|
| 5,793,623 A | 8/1998 | Kawashima et al. | |
| 5,920,186 A * | 7/1999 | Ninh et al. | 323/303 |
| 6,714,429 B2 * | 3/2004 | Phadke | 363/89 |
| 7,911,352 B2 * | 3/2011 | Bucella et al. | 340/654 |
| 2004/0090807 A1 | 5/2004 | Youm | |

FOREIGN PATENT DOCUMENTS

| | | |
|---|---|---|
| CN | 1121164 A | 4/1996 |
| EP | 0 695 024 A2 | 1/1996 |
| EP | 1 755 209 A1 | 2/2007 |
| EP | 2 381 573 A1 | 10/2011 |
| JP | 5-316640 A | 11/1993 |
| JP | 10-271668 A | 10/1998 |
| JP | 11-164555 A | 6/1999 |
| JP | 2005-137054 A | 5/2005 |
| JP | 2009-027804 A | 2/2009 |
| JP | 2010-238835 A | 10/2010 |
| WO | 2010/073552 A1 | 7/2010 |

OTHER PUBLICATIONS

Office Action dated Apr. 5, 2013, issued by the Australian Patent Office in the corresponding Australian Application No. 2011226887. (3 pages).
Extended European Search Report dated Feb. 19, 2013, issued by the European Patent Office in the corresponding European Application No. 11008135.3. (9 pages).
Japanese Office Action (Notice of Reasons for Rejection) dated Oct. 23, 2012, issued in corresponding Japanese Patent Application No. 2010-243084, and English language translation of Office Action. (5 pages).
Nov. 29, 2013 Chinese Office Action issued in Chinese Patent Application No. 201110335200.9, pp. 1-10.

\* cited by examiner

*Primary Examiner* — Harry Behm
(74) *Attorney, Agent, or Firm* — Buchanan Ingersoll & Rooney PC

(57) ABSTRACT

[Problem] To provide a power converter capable of suppressing voltage dropping of the smoothing capacitor and suppressing a rush current at the time of power recovery,
[Means for Resolution] When it is determined that a bus voltage Vdc detected by a DC voltage detecting unit 24 is equal to or less than a predetermined reference voltage, a control device 20 allows a DC load control unit 23 to stop an operation of a DC load 30.

10 Claims, 5 Drawing Sheets

10: AC POWER SOURCE
11: CURRENT LIMITING RESISTOR
12: SWITCHING UNIT
20: CONTROL DEVICE
24: DC VOLTAGE DETECTING UNIT
31: SMOOTHING CAPACITOR

10: AC POWER SOURCE
11: CURRENT LIMITING RESISTOR
12: SWITCHING UNIT
20: CONTROL DEVICE
24: DC VOLTAGE DETECTING UNIT
31: SMOOTHING CAPACITOR

POWER CONVERTER WITH A VARIABLE REFERENCE VOLTAGE AND INRUSH CURRENT LIMITING

BACKGROUND OF THE INVENTION

1. Field of the Invention

The present invention relates to a power converter including an active converter capable of obtaining an arbitrary DC (direct current) voltage, and more particularly, to a rush current suppressing operation.

2. Background Art

In an ordinary converter circuit, a current limiting resistor is provided in series with a smoothing capacitor, such that a rush current at the time of power-on is suppressed, and is bypassed through a current limiting resistor by a switching unit such as a relay at a steady state such as at the time of energization of a load (for example, refer to FIG. 4 of JP-A-10-271668).

In addition, there is disclosed a power converter in which at the time of instantaneous power failure, a voltage between both ends of the smoothing capacitor and a predetermined reference voltage are compared to each other, and based on a result of this comparison, a switching element connected in parallel with the current limiting resistor is controlled, such that the rush current is suppressed (for example, refer to JP-A-05-316640, Page 2).

In addition, there is disclosed a method of limiting the rush current in which the instantaneous power failure is detected by monitoring a zero cross of an AC (alternating current) voltage, the time of the instantaneous power failure that is permissible is calculated based on an electrostatic capacitance of a smoothing capacitor and a load current, and a switching operation of a relay connected in parallel with the current limiting resistor is controlled (for example, refer to JP-A-10-271668, Page 2).

CITATION LIST

Patent Literature

PTL1: JP05-316640 A
PTL2: JP10-271668 A

SUMMARY OF THE INVENTION

In regard to the method of suppressing a rush current that occurs at the time of power recovery from instantaneous power failure in the related art, there is a problem that, as a path through which the rush current flows is switched by a relay in such a manner that the rush current passes through the current limiting resistor, in a case where the power is recovered within an extremely short period until the relay is operated after the occurrence of the instantaneous power failure, it is impossible to suppress the rush current.

In addition, a reference voltage (threshold value) that is used for the switching of the relay or the stopping of a DC load described below is a fixed value that is determined in advance, thus there is a problem in that a maximum voltage input to a product is not considered.

In addition, the magnitude of the rush current that occurs at the time of power recovery from the instantaneous power failure is dependent on a difference between a DC voltage immediately before power recovery from the instantaneous power failure, that is, the voltage between both ends of the smoothing capacitor, and an AC voltage input to the active converter at the time of power recovery from the instantaneous power failure. The larger the load connected to an output side of the active converter, the more quickly the voltage between both ends of the smoothing capacitor decreases when the instantaneous power failure occurs, such that the magnitude of the rush current becomes large and in a case where a current resistant property of a semiconductor element or the like, which is disposed on a path through which the rush current flows, is low, there is a problem in that a breakdown of the semiconductor element or the like is caused. Therefore, it is necessary to have the current resistant property determined in consideration of a delayed operation of the relay connected in parallel with the current limiting resistor, such that the semiconductor element or the like becomes large, and therefore there is a problem in that the miniaturization of the semiconductor element or the like is adversely affected, and cost reduction is also hindered. Particularly, in a case where a wide band gap semiconductor that has a weak current resistant property with respect to the instantaneous current and is formed of expensive SiC, GaN, diamond, or the like is used as the active converter, the cost reduction through the miniaturization is hindered.

The invention is made to solve the above-described problems, and a first object of the invention is to obtain a power converter that suppresses the rush current at the time of power recovery by suppressing voltage dropping of the smoothing capacitor.

In addition, a second object of the invention is to obtain a power converter that suppresses the rush current at the time of power recovery before a switching element used for suppressing the rush current operates, by making a difference small between a voltage between both ends of the smoothing capacitor immediately before power recovery from the instantaneous power failure, and an AC voltage input to the active converter at the time of power recovery from the instantaneous power failure.

According to an aspect of the invention, there is provided a power converter having an active converter that includes a semiconductor element, and is supplied with an AC voltage from an AC power source, rectifies the AC voltage into an DC voltage, and raises the DC voltage to an arbitrary DC voltage; a smoothing capacitor that is connected to en output side of the active converter with a DC load connected to both ends of the smoothing capacitor, and smoothes the DC voltage output from the active converter; a current limiting resistor that is connected between the AC power source and the active converter, and limits a current flowing from the AC power source; a switching unit that is connected in parallel with the current limiting resistor; a DC voltage detecting unit detecting a bus voltage that is a voltage between both ends of the smoothing capacitor; and a control device that controls a voltage-raising operation of the DC voltage output from the active converter. The control device turns on the switching unit in a case where the AC voltage is output from the AC power source, and turns off the switching unit in a case where a power failure occurs in the AC power source, and the control device stops an operation of the DC load when it is determined that the bus voltage detected by the DC voltage detecting unit is equal to or less than a predetermined reference voltage.

According to this aspect of the invention, in a case where the bus voltage is equal to or less than a predetermined reference voltage, dropping of the bus voltage is suppressed by stopping the operation of the DC load, and therefore it is possible to suppress a rush current at the time of power recovery before switching into a path on which a current limiting resistor is provided by turning off the switching unit.

DETAILED DESCRIPTION OF THE INVENTION

Embodiment 1
Configuration of Power Converter

Figure 1:
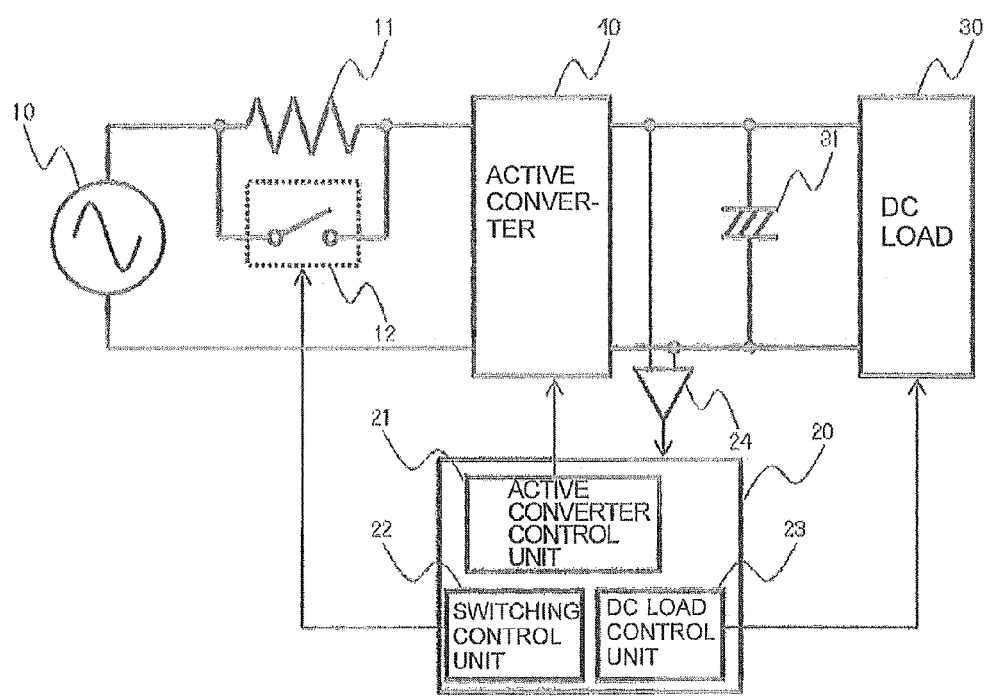
FIG. 1 is a diagram illustrating a configuration example of a power converter including an active converter 40 according to Embodiment 1 of the invention.

FIG. 1 shows a diagram illustrating a configuration example of a power converter including an active converter 40 according to Embodiment 1 of the invention.

As shown in FIG. 1, the active converter 40 is connected to an AC power source 10 such as a commercial power source, and a current limiting resistor 11 that suppresses a rush current is connected between the AC power source 10 and the active converter 40. A switching unit 12 for bypassing the current limiting resistor 11 is connected in parallel with both ends of the current limiting resistor 11. A smoothing capacitor 31 is connected to an output side of the active converter 40, and a DC load 30 is connected to both ends of the smoothing capacitor 31. In addition, a DC voltage detecting unit 24 for detecting an output voltage of the active converter 40, that is, a voltage between both ends of the smoothing capacitor 31, is connected to an output side of the active converter 40, and this DC voltage detecting unit 24 is connected to a control device 20 such as a microcomputer.

The active converter 40 includes a semiconductor element or the like, and has a function of rectifying an AC voltage supplied from the AC power source 10 into a DC voltage and of raising the DC voltage to an arbitrary DC voltage. The raised DC voltage is output to the DC load 30. At this time, the DC voltage output by the active converter 40 is made to be smoothed by the smoothing capacitor 31. In addition, when not performing the voltage-raising operation, the active converter 40 operates as an ordinary passive diode bridge, and rectifies the AC voltage supplied from the AC power source 10.

The semiconductor element making up the active converter 40 may include a wide band gap semiconductor such as Sic, GaN, and diamond.

The control device 20 receives voltage information of the voltage between both ends of the smoothing capacitor 31, which is detected by the DC voltage detecting unit 24. In addition, the control device 20 includes an active converter control unit 21 that controls the DC voltage output by the active converter 40, a switching control unit 22 that controls a bypass operation by the switching unit 12, and a DC load control unit 23 that controls an operation of the DC load 30 that is an inverter including a semiconductor switching element, or the like, and that is capable of allowing this operation to be stopped immediately.

Control Operation of Rush Current

Figure 2:
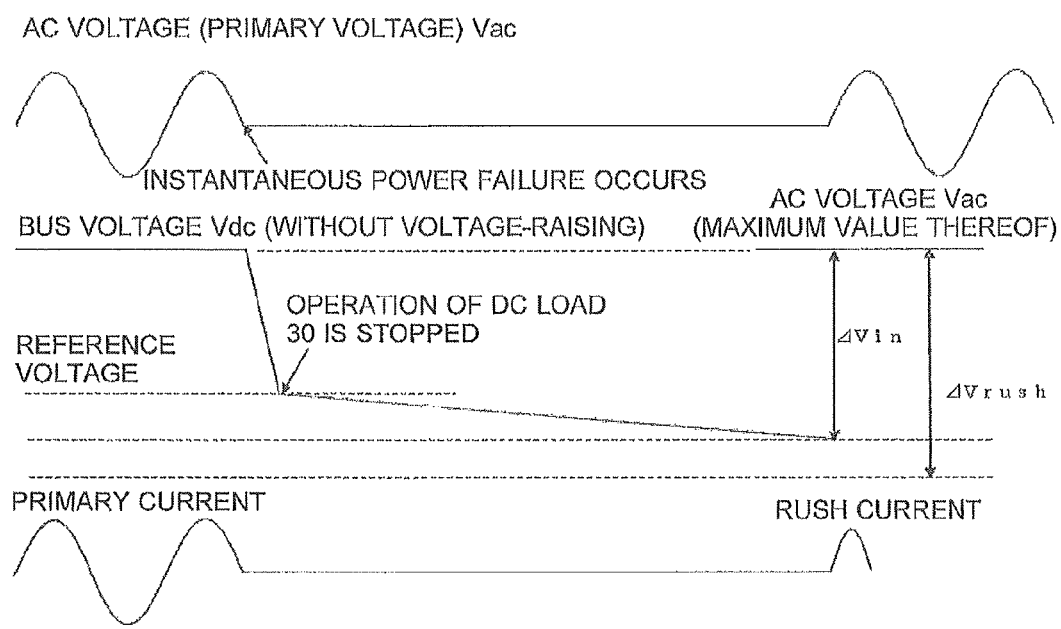
FIG. 2 is a diagram illustrating a transition of a voltage between both ends of a smoothing capacitor 31 until power is recovered from an instantaneous power failure, and a suppressing operation of a rush current in the power converter according to Embodiment 1 of the invention.

FIG. 2 shows a diagram illustrating a transition of a voltage between both ends (hereinafter, referred to as a bus voltage Vdc) of a smoothing capacitor 31 until power is recovered from an instantaneous power failure, and a suppressing operation of a rush current in the power converter according to Embodiment 1 of the invention. In FIG. 2, there is illustrated an example in a case where the active converter 40 does not perform a voltage-raising operation but performs the same operation as the passive diode bridge.

As shown in FIG. 2, when the instantaneous power failure occurs, the supply of the AC voltage from the AC power source 10 is stopped, and a charge operation with respect to the smoothing capacitor 31 is also stopped, such that a current flows from the smoothing capacitor 31 to the DC load 30, and therefore a discharge occurs and the bus voltage Vdc drops. At this time, the control device 20 allows the DC load control unit 23 to stop an operation of the DC load 30 when it is determined that the bus voltage Vdc detected by the DC voltage detecting unit 24 is equal to or less than a predetermined reference voltage. In this manner, dropping of the voltage between both ends of the smoothing capacitor 31, that is, dropping of the bus voltage Vdc is suppressed, and it is possible to suppress a rush current at the time of power recovery during a period before switching into a path on which a current limiting resistor 11 is provided by allowing the switching control unit 22 to turn off the switching unit 12. At this time, a timing at which the control device 20 allows the switching control unit 22 to turn off the switching unit 12 may be a case where the bus voltage Vdc is equal to or less than the reference voltage, or the switching unit 12 may be turned off under another condition.

At this time, it is necessary to make a difference $\Delta Vin$ between a maximum value, which is defined in terms of a product, of the AC voltage input to the active converter 40 at the time of power recovery from the instantaneous power failure and the bus voltage Vdc immediately before power recovery from the instantaneous power failure, smaller than a limit value $\Delta Vrush$ of $\Delta Vin$, which is a current resistant property of a semiconductor element, against the rush current in the active converter 40.

Figure 3:
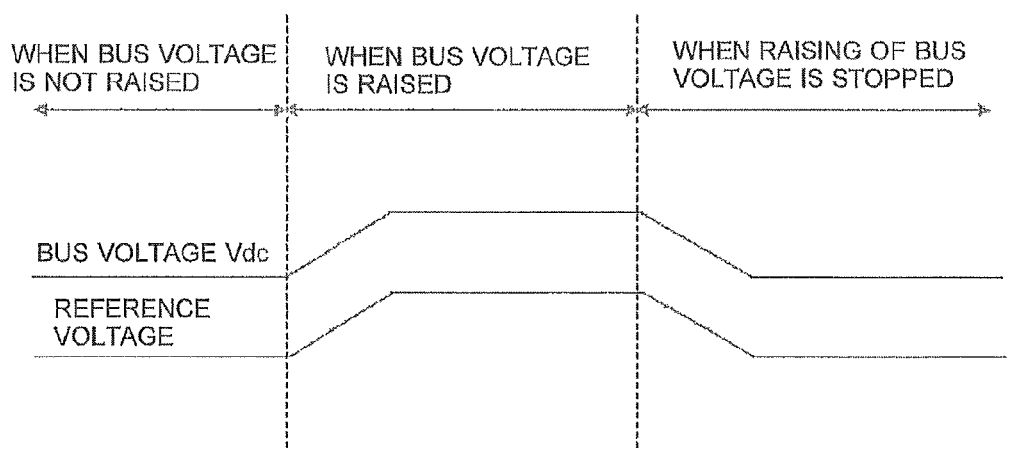
FIG. 3 is a diagram illustrating a relationship between a bus voltage Vdc and a reference voltage in the power converter according to Embodiment 1 of the invention.

FIG. 3 shows a diagram illustrating a relationship between the bus voltage Vdc and the reference voltage in the power converter according to Embodiment 1 of the invention. Hereinafter, the method of setting the reference voltage described above will be described with reference to FIG. 3.

In the case of not performing the voltage-raising operation, the active converter 40 operates as an ordinary passive diode bridge as described above and rectifies the AC voltage supplied from the AC power source 10. At this time, the bus voltage Vdc that is a DC voltage rectified by the active converter 40 is detected by the DC voltage detecting unit 24, and the control device 20 subtracts a margin from the detected bus voltage Vdc in consideration of a false detection due to a variation in the DC load 30 or a variation in the output voltage from the active converter 40, which is caused by a voltage ripple or the like, and sets the reference voltage based on a value obtained by estimating the AC voltage of the AC power source 10, which is input to the active converter 40 from the bus voltage Vdc, in such a manner that the difference $\Delta Vin$ does not exceed the threshold limit value $\Delta Vrush$. Here, for example, the control device 20 divides the bus voltage Vdc detected by the DC voltage detecting unit 24 by the square root of 2, and thereby the AC, voltage of the AC power source 10 is estimated. The control device 20 determines the estimated AC voltage as the AC voltage of the AC power source 10 at the time of power recovery from the instantaneous voltage. When the control device 20 performs the setting operation of the reference voltage as described above for each predetermined time in a period where the active converter 40 does not perform the voltage-raising operation, it is possible to handle the variation in the AC voltage (primary voltage) output from the AC power source 10, and it is possible to set a reference voltage corresponding to the varied AC voltage.

In addition, the control device 20 may include means for detecting the AC voltage of the AC power source 10 and may use the detected AC voltage instead of estimating the AC voltage of the AC power source 10 based on the bus voltage Vdc detected by the DC voltage detecting unit 24.

Next, the active converter 40 performs the voltage-raising operation, and in a case where an output DC voltage is raised, the raised DC voltage is detected by the DC voltage detecting unit 24 as the bus voltage Vdc, and the control device 20 subtracts a margin from the detected bus voltage Vdc in consideration of a false detection due to a variation in the DC load 30 or a variation in the output voltage from the active converter 40, which is caused by a voltage ripple or the like, and sets a reference voltage. That is, as shown in FIG. 3, whenever the output voltage (bus voltage Vdc) of the active converter 40 is varied by the active converter control unit 21, the reference voltage is also varied in conjunction with this variation.

When it is determined that the output voltage of the active converter 40 is raised to an arbitrary DC voltage based on the bus voltage Vdc detected by the DC voltage detecting unit 24, the control device 20 may subtract a margin from the arbitrary DC voltage in consideration of a false detection due to a variation in the DC load 30 or a variation in the output voltage from the active converter 40, which is caused by a voltage ripple or the like, and may set a reference voltage.

Figure 4:
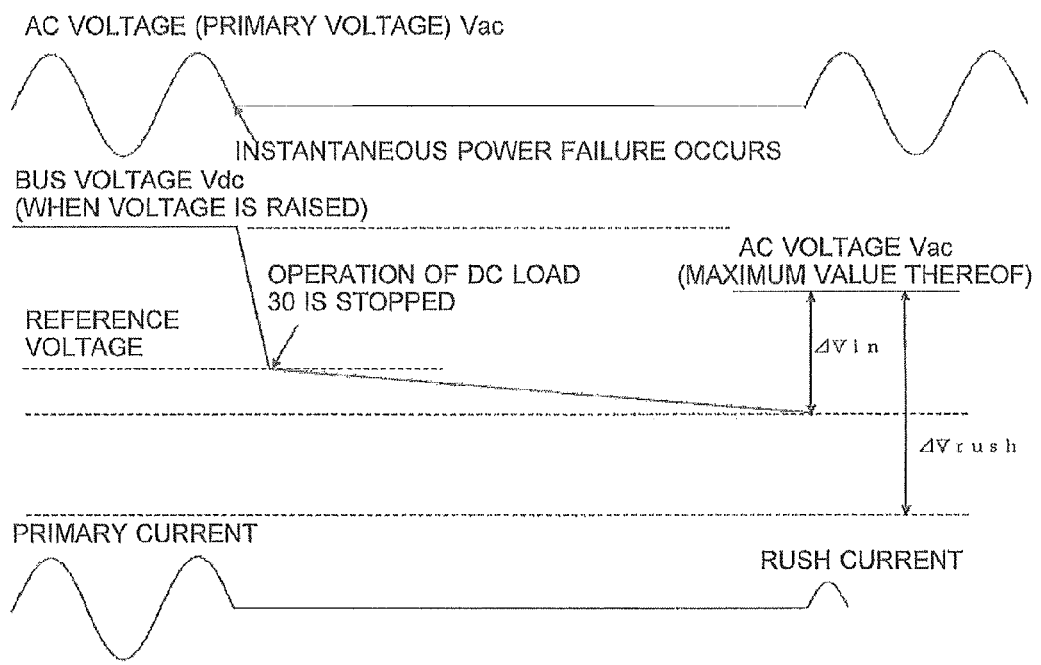
FIG. 4 is a diagram illustrating a transition of the bus voltage Vdc until the power is recovered from the instantaneous power failure, and the suppressing operation of the rush current in the power converter according to Embodiment 1 of the invention, in a case where the active converter 40 of the power converter according to Embodiment 1 of the invention performs a voltage-raising operation.

FIG. 4 shows a diagram illustrating a transition of the bus voltage Vdc from the instantaneous power failure to recovery, and the suppressing operation of the rush current in a case where the active converter 40 of the power converter according to Embodiment 1 of the invention performs a voltage-raising operation.

As shown in FIG. 4, when the active converter 40 performs the voltage-raising operation, as a voltage-raising level becomes large, a difference $\Delta Vin$ between a maximum value of an AC voltage input to the active converter 40 at the time of power recovery from the instantaneous power failure and a bus voltage Vdc immediately before the power recovery from the instantaneous power failure becomes small, and therefore it is possible to effectively suppress the rush current.

Operation at the Time of Stopping of Voltage-Raising Operation

Figure 5:
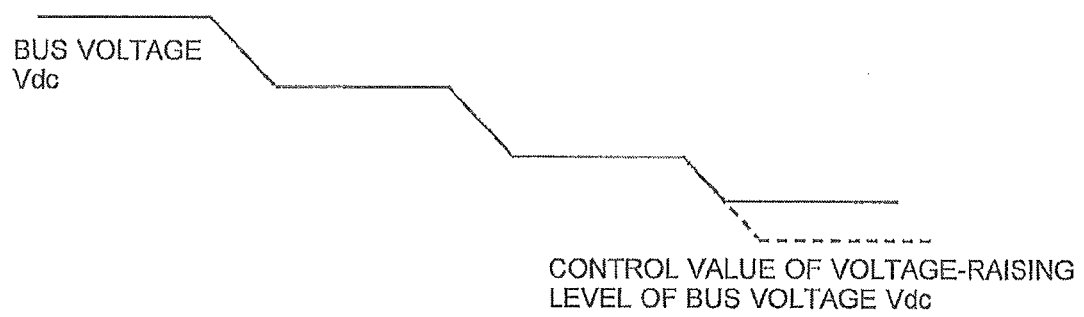
FIG. 5 is a diagram illustrating a control of lowering a voltage-raising level in a stepwise manner in a case where the active converter 40 of the power converter according to Embodiment 1 of the invention stops the voltage-raising operation.

FIG. 5 shows a diagram illustrating a control of lowering a voltage-raising level in a stepwise manner in a case where the active converter 40 of the power converter according to Embodiment 1 of the invention stops the voltage-raising operation. Hereinafter, description will be given with respect to an operation where a voltage-raising level is lowered in a stepwise manner in a case where the voltage-raising operation of the active converter 40 is stopped, with reference to FIG. 5.

In a case where the active converter 40 stops the voltage-raising operation and transits to an ordinary passive rectification operation, the control device 20 allows the active converter control unit 21 to perform an operation of lowering a voltage-raising level by the active converter 40 in a stepwise manner as shown in FIG. 5. Then, the control device 20 sets a reference voltage in each voltage-raising level by the active converter 40 according to the above-described method. At this time, the control device 20 determines whether a control value of the voltage-raising level determined by the active converter control unit 21 for the active converter 40 is less than the bus voltage Vdc detected by the DC voltage detecting unit 24. When it is determined that the control value of the voltage-raising level is less than the bus voltage Vdc, the control device 20 estimates the AC voltage of the AC power source 10 from the bus voltage Vdc and then sets the reference voltage.

According to the above-described operation, even when the AC voltage of the AC power source 10 that is a primary voltage is varied during a voltage-raising operation period by the active converter 40, the varied AC voltage is estimated, and it is possible to set the reference voltage based on the estimated value.

Effect of Embodiment 1

Like the above-described configuration and operation, when it is determined that the bus voltage detected by the DC voltage detecting unit 24 is equal to or less than a predetermined reference voltage, the control device 20 suppresses the dropping of the bus voltage Vdc by stopping an operation of the DC load 30, and therefore it is possible to suppress the rush current at the time of power recovery during a period before switching into a path on which a current limiting resistor 11 is provided by turning off the switching unit 12.

In addition, corresponding to the voltage-raising level of the active converter 40, the control device 20 subtracts a margin from the detected bus voltage Vdc in consideration of a false detection due to a variation in the DC load 30 or a variation in the output voltage from the active converter 40, which is caused by a voltage ripple or the like, and sets the reference voltage in such a manner that the difference $\Delta Vin$ does not exceed the threshold limit value $\Delta Vrush$. Therefore, even when the power is recovered during a period until the switching unit 12 is turned off from the instantaneous power failure, it is possible to suppress the rush current. In addition, by suppressing the rush current in this manner, it is possible to miniaturize the semiconductor element making up the active converter 40, and it is possible to realize the cost reduction, Particularly, in a case where the semiconductor element includes a wide band gap semiconductor that is formed of SIC, GaN, diamond, or the like, the effect of the cost reduction through the miniaturization is increased, In addition, according to the variation in the voltage-raising level of the active converter 40, the reference voltage is also varied by the control device 20 in conjunction with this variation, such that the larger a voltage-raising level, the smaller a difference $\Delta Vin$ between a maximum value of an AC voltage input to the active converter 40 at the time of power recovery from the instantaneous power failure and a bus voltage Vdc immediately before the power recovery from the instantaneous power failure, and therefore it is possible to effectively suppress the rush current.

In a case where the active converter 40 stops the voltage-raising operation and transits to an ordinary passive rectification operation, the control device 20 performs a control of lowering the voltage-raising level by the active converter 40 in a stepwise manner, and determines whether a control value of the voltage-raising level determined by the active converter control unit 21 for the active converter 40 is less than the bus voltage Vdc. Then, even when the AC voltage of the AC power source 10 that is a primary voltage is varied during a voltage-raising period by the active converter 40, the varied AC voltage is estimated, and it is possible to set the reference value based on the estimated value.

What is claimed is:

1. A power converter, comprising:
an active converter that includes a semiconductor element, is supplied with an AC voltage from an AC power source, rectifies the AC voltage into a DC voltage, and raises the DC voltage to an arbitrary DC voltage;
a smoothing capacitor that is connected to an output side of the active converter with a DC load connected to both ends of the smoothing capacitor, and smoothes the DC voltage output from the active converter;
a current limiting resistor that is connected between the AC power source and the active converter, and limits a current flowing from the AC power source;
a switching unit that is connected in parallel with the current limiting resistor;
a DC voltage detecting unit detecting a bus voltage that is a voltage across the smoothing capacitor; and
a control device that controls a voltage-raising operation of the DC voltage output from the active converter,
wherein the control device turns on the switching unit in a case where the AC voltage is output from the AC power source, and turns off the switching unit in a case where a power failure occurs in the AC power source,
the control device stops an operation of the DC load when it is determined that the bus voltage detected by the DC voltage detecting unit is equal to or less than a predetermined reference voltage, and
when the bus voltage of the active converter is varied by the control device, the predetermined reference voltage is also varied in conjunction with variation of the bus voltage.

2. The power converter of claim 1,
wherein in a case where the active converter performs the voltage-raising operation, the control device subtracts a margin in consideration of a false detection due to a variation in the output voltage of the active converter and sets the reference voltage.

3. The power converter of claim 1,
wherein the semiconductor element is a wide band gap semiconductor.

4. The power converter of claim 3,
wherein the wide band gap semiconductor is formed of SiC, GaN, or diamond.

5. The power converter of claim 1,
wherein the control device is connected to the switching unit, the active converter, and the DC load.

6. The power converter of claim 1,
wherein the control device is directly connected to the DC load.

7. The power converter of claim 1,
wherein the control device is directly connected to the active converter.

8. The power converter of claim 1,
wherein the control device sets the reference voltage according to a voltage level of the DC voltage output from the active converter.

9. A power converter, comprising:
an active converter that includes a semiconductor element, is supplied with an AC voltage from an AC power source, rectifies the AC voltage into a DC voltage, and raises the DC voltage to an arbitrary DC voltage;
a smoothing capacitor that is connected to an output side of the active converter with a DC load connected to both ends of the smoothing capacitor, and smoothes the DC voltage output from the active converter;
a current limiting resistor that is connected between the AC power source and the active converter, and limits a current flowing from the AC power source;
a switching unit that is connected in parallel with the current limiting resistor;
a DC voltage detecting unit detecting a bus voltage that is a voltage across the smoothing capacitor; and
a control device that controls a voltage-raising operation of the DC voltage output from the active converter,
wherein the control device turns on the switching unit in a case where the AC voltage is output from the AC power source, and turns off the switching unit in a case where a power failure occurs in the AC power source,
the control device stops an operation of the DC load when it is determined that the bus voltage detected by the DC voltage detecting unit is equal to or less than a predetermined reference voltage,
wherein in a case where the active converter does not perform the voltage-raising operation but performs a rectification operation of the AC voltage, the control device estimates the AC voltage of the AC power source based on the bus voltage detected by the DC voltage detecting unit, subtracts a margin in consideration of a false detection due to a variation in an output voltage of the active converter, and sets the reference voltage based on a value of the estimated AC voltage.

10. A power converter, comprising:
an active converter that includes a semiconductor element, is supplied with an AC voltage from an AC power source, rectifies the AC voltage into a DC voltage, and raises the DC voltage to an arbitrary DC voltage;
a smoothing capacitor that is connected to an output side of the active converter with a DC load connected to both ends of the smoothing capacitor, and smoothes the DC voltage output from the active converter;
a current limiting resistor that is connected between the AC power source and the active converter, and limits a current flowing from the AC power source;
a switching unit that is connected in parallel with the current limiting resistor;
a DC voltage detecting unit detecting a bus voltage that is a voltage across the smoothing capacitor; and
a control device that controls a voltage-raising operation of the DC voltage output from the active converter,
wherein the control device turns on the switching unit in a case where the AC voltage is output from the AC power source, and turns off the switching unit in a case where a power failure occurs in the AC power source,
the control device stops an operation of the DC load when it is determined that the bus voltage detected by the DC voltage detecting unit is equal to or less than a predetermined reference voltage,
wherein in a case where the active converter stops the voltage-raising operation and transits to a rectification operation, the control device lowers a voltage-raising level in a stepwise manner, and in each state of being lowered in the stepwise manner, when it is determined that a control value of the voltage-raising level with respect to the active converter is less than the bus voltage detected by the DC voltage detecting unit, the control device estimates the AC voltage of the AC power source based on the bus voltage and sets the reference voltage based on the estimated AC voltage value.

* * * * *